United States Patent [19]
Burr

[11] 3,993,005
[45] Nov. 23, 1976

[54] TABLE LEG AND SUPPORTING STRUCTURE

[75] Inventor: Alan C. Burr, East Norwalk, Conn.

[73] Assignee: Howe Furniture Corporation, New York, N.Y.

[22] Filed: Sept. 8, 1975

[21] Appl. No.: 611,131

[52] U.S. Cl. .............................. 108/156; 248/188; 403/383; 403/384
[51] Int. Cl.² .......................................... A47B 3/06
[58] Field of Search ......... 108/156; 248/188, 188.8; 52/727, 753 D; 297/440; 5/288, 310; 403/10, 167, 231, 236, 263, 384, 382, 171, 176, 219

[56] References Cited
UNITED STATES PATENTS

| | | | |
|---|---|---|---|
| 3,195,196 | 7/1965 | Carisi | 5/288 X |
| 3,341,160 | 9/1967 | Jones | 248/188.8 |
| 3,883,104 | 5/1975 | Pelafield | 108/156 X |
| 3,887,288 | 6/1975 | Glaser | 248/188 X |

FOREIGN PATENTS OR APPLICATIONS

| | | | |
|---|---|---|---|
| 2,102,266 | 7/1972 | Germany | 108/156 |

*Primary Examiner*—James T. McCall
*Attorney, Agent, or Firm*—Buckles and Bramblett

[57] ABSTRACT

A table leg supporting structure is formed by a pair of metallic side rail flange members mounted at right angles to each other on the underside of a table top and abutting each other to form a corner therebetween. A hollow tubular leg has a ninety degree sector of its sidewall removed in proximity to its upper end, and a ninety degree angle member welded therein. A machine screw passed through a hole drilled in the corner junction of the paired flange members is threaded into the angle member within the tubular leg. The foregoing abstract is not to be taken either as a complete exposition or as a limitation of the present invention, and in order to understand the full nature and extent of the technical disclosure of this application, reference must be had to the following detailed description and the accompanying drawings as well as to the claims.

3 Claims, 5 Drawing Figures

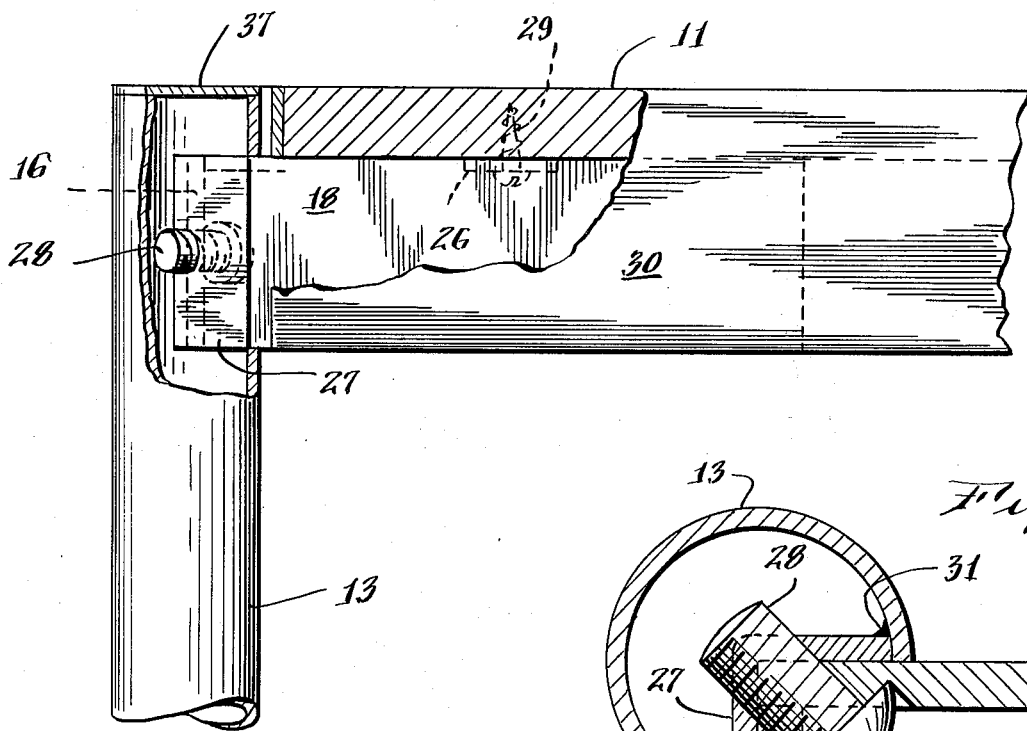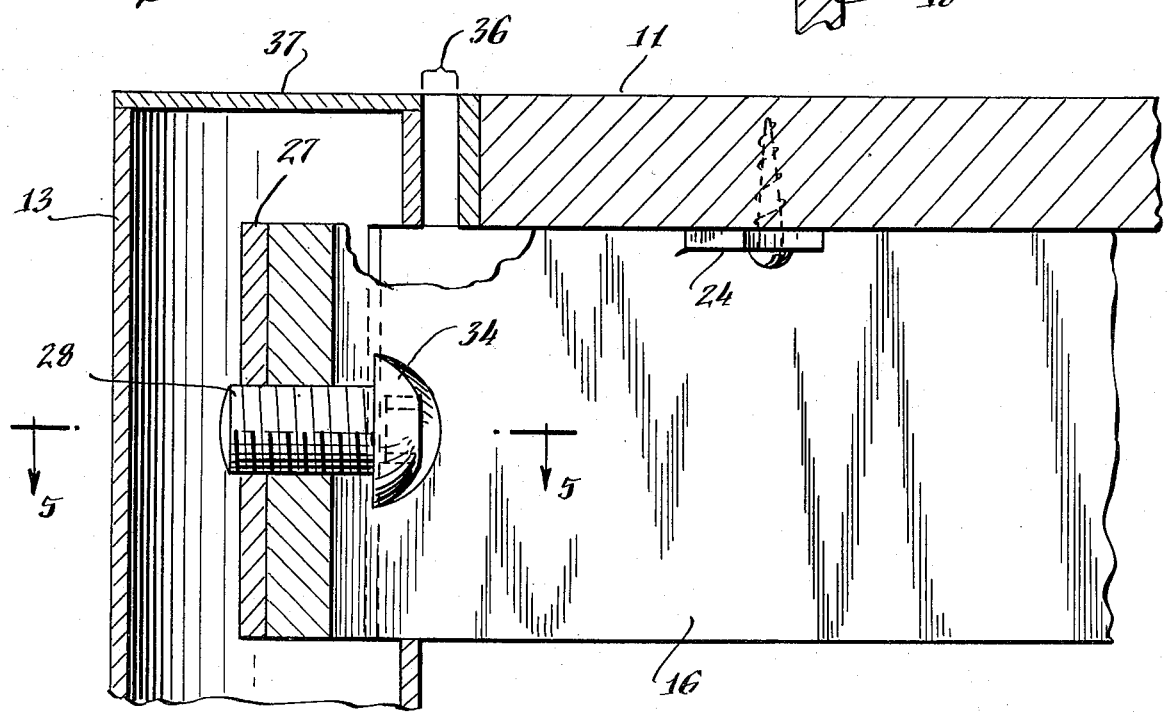

TABLE LEG AND SUPPORTING STRUCTURE

BACKGROUND OF THE INVENTION

The invention relates to a new table leg supporting structure whereby metallic tubular legs are mounted to a flat table top in spaced relation from the edges thereof in a manner to create the illusion of free floating support. The desire to create this visual impression gave rise to the present structural invention. The esthetic appearance of the resulting tables is the subject of separate design patent applications. A related utility patent application, Ser. No. 611,132 filed concurrently herewith is directed to a foldable table leg construction embodying features of the present invention.

OBJECTS OF THE INVENTION

A principal object of the present invention is to provide an improved tubular table leg supporting structure which is quite rigid and yet gives the impression of light weight free-floating support.

Another object of the invention is to provide such a table support structure that is economical to manufacture and assemble on a mass production basis.

A further object of the invention is to provide a table leg supporting structure of the above character which is readily adaptable to a wide variety of table shapes.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIG. 3 is a front view, partially broken away, showing the construction of one corner of the table of FIG. 1;

FIG. 4 is an enlarged cross-sectional view taken along the line 4—4 of FIG. 2; and FIG. 5 is a cross-sectional view taken along the line 5—5 of FIG. 4.

DETAILED DESCRIPTION

Figure 1:
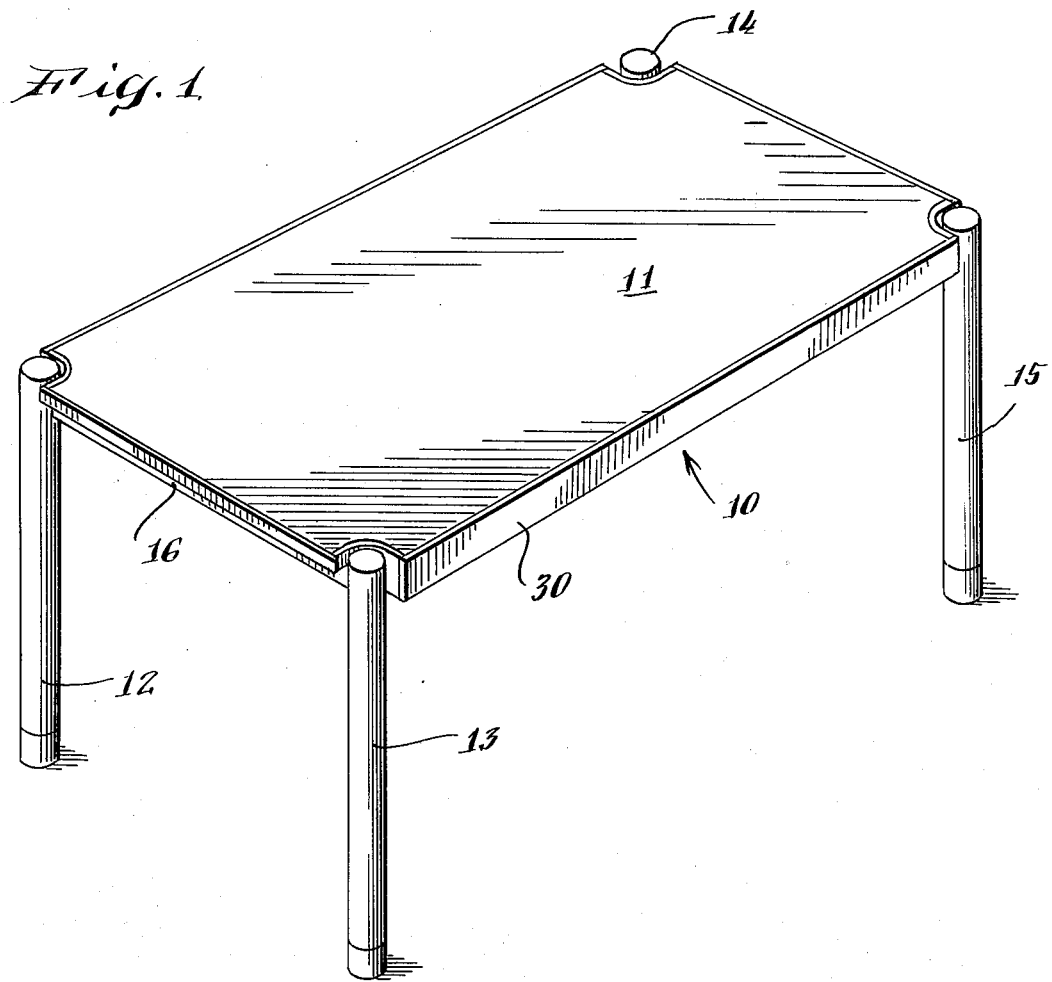
FIG. 1 is a perspective view of one form of table embodying the present invention.

Referring first of FIG. 1 of the drawings, the invention comprises a table indicated generally at 10, having a flat top 11 supported by legs 12, 13, 14 and 15 located spaced from the four corners of the table top 11. For purposes of esthetic design the legs 12-15 are mounted in a manner to present their upper ends in a plane flush with and parallel to the plane of table top 11, and arcuately spaced from the arcuately indented corners of table top 11.

Figure 2:
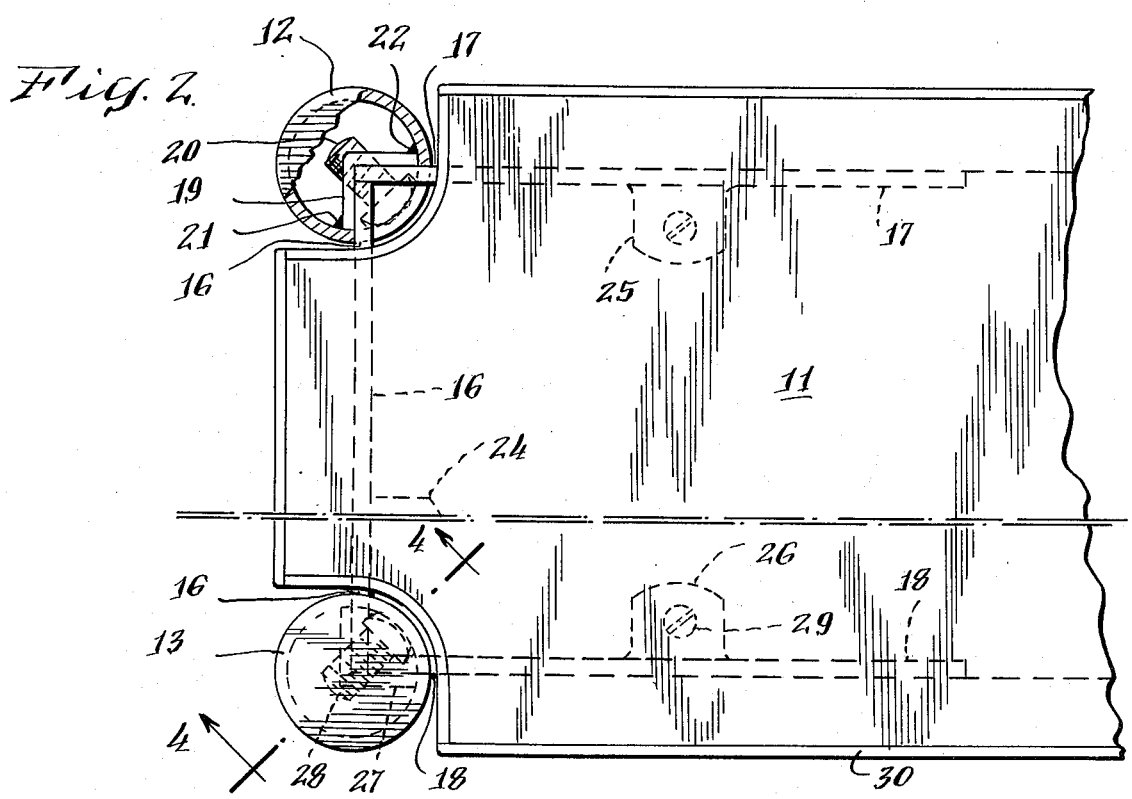
FIG. 2 is a top plan view, compressed and partially broken away, showing the mounting of one pair of legs at one end of the table of FIG. 1.

Referring now to the plan view of FIG. 2 it may be seen that tubular leg 12 is mounted to vertical flange members 16 and 17 which abut each other in intimate engagement with a vertical right angle member 19 inserted within the hollow tubular leg 12. The flange members 16 and 17 are inserted through a sector opening formed in the sidewall of tubular leg 12 in alignment with right angle member 19. Angle member 19 is secured to the inner surface of tubular leg 12 by welding or brazing at 21 and 22 (as may be seen more clearly in the enlarged view of FIG. 5). Flanges 16 and 17 are secured to angle member 19 by a machine screw 20. Leg 13 is similarly mounted to the opposite end of flange 16 and flange 18. Right angle mounting ears 24, 25 and 26 (shown in broken lines in FIG. 2) are secured to vertical flange members 16, 17 and 18, respectively, and provide means for securing the flange members to the underside of table top 11.

Reference is now had to FIG. 3 of the drawings wherein the front table edge 30 is partially broken away at the corner, as is also the upper portion of tubular table leg 13. Here a machine screw 28, which is identical to screw 20 is FIG. 2, passes through a hole drilled in the corner junction of flange plates 16 and 18 and is threaded into the corner of vertical angle member 27 which is welded into the hollow interior of tubular leg 13. A wood screw 29 passes through right angle mounting ear 26 to secure flange member 18 to the underside of table top 11.

As shown more clearly in the enlarged top cross-sectional view of FIG. 5 the angle member 27 is welded or brazed to the inner wall surface of hollow tubular leg 13, adjacent the edges of the sector opening through the sidewall thereof, by vertical linear beads 31 and 32. As also shown in FIG. 5 the head 34 of machine screw 28 is recessed in a counterbore 35 machined into the inner surfaces of flange members 16 and 18 coaxial with the mounting hole drilled through the assembled corner formed therebetween, and with the aligned tapped hole in angle member 27 into and through which screw 28 is threaded. Preferably the outer portion of the head 34 of screw 28 is recessed within, or at least tangential to, the outer circumference of the tubular table leg 13. It is particularly to be noted that in manufacture and assembly of the leg corner supporting structure according to the invention the corner flange members 16 and 18 need not be welded or otherwise connected to each other, but that the single machine screw 28 when threaded through the inner angle member 27 effectively and securely clamps the corner juncture of abutting flange ends 16 and 18 to the angle member 27 and leg 13. This eliminates considerable expense in the form of labor and, as the abutting ends of flange members 16 and 18 are formed exactly square with the sides thereof, a rigid mounting of the tubular leg perpendicular to the support flanges and table top is achieved.

FIG. 4 shows in enlarged vertical detail the assembled structure hereinabove described, as viewed in cross-section along the line 4—4 of FIG. 2. The desired spacing 36 between the table leg 13 and the recessed edge of the table top 11 is also clearly discernable in this view. For practical as well as esthetic purposes the tops of the hollow tubular legs such as 13 are capped with a metallic disc such as 37 which may be polished, burnished or plated along with corresponding surface treatment to the tubular legs. It will also be readily understood that the vertical flange members 17 and 18 may extend to engage with opposite pairs of legs, as does member 16 in the disclosed embodiment, and thereby form a rigid rectangular frame which may support any desired shape of table top.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. Table supporting means comprising in combination, a hollow tubular leg having a sidewall defining, in cross section, a continuous closed curve with a discrete sector portion of limited dimension and approximating an arc of ninety degrees removed therefrom to form an opening in said tubular wall, an angle member of length corresponding to said limited dimension secured within said hollow tubular leg at said removed sector portion with the apex edge of said angle member positioned inwardly of said tubular wall, a pair of side rail flange members of width substantially equal to said limited dimension and having their abutting ends inserted into said opening in engagement with said angle member to form a closed corner therewith, and a machine screw passed through a hole drilled in said closed corner ends of said flange members and threaded into a tapped hole in said angle member, whereby when said screw is tightened said flange members are drawn into firm engagement with said angle member to form a rigid union between said side rail flange members and said hollow tubular leg.

2. The combination of claim 1 wherein said machine screw is counter sunk into a counter bore formed in said side rails coaxial with the corner hole therethrough.

3. A table construction comprising in combination, a flat table top, a plurality of tubular legs each having a sidewall defining, in cross section, a continuous closed curve, means forming a right angular recess of predetermined dimension within each of said legs in proximity to one end thereof with the apex edge of said recess forming means positioned inwardly of said sidewall, a plurality of elongated flange members of width corresponding to said predetermined dimension, pairs of said flange members having one end of each inserted into the angular recesses of each of said legs, said flange ends in abutting engagement one with another within said angular recesses, a screw mounting hole passing through said abutting flange ends normal to the axis of said legs, screw means passing through said mounting hole into threadable engagement with said right angular recess forming means whereby when said screw means is tightened said flange ends are drawn into firm engagement with said angular recess forming means, and means on each of said flange members for securing the same to the underside of said flat table top.

* * * * *